United States Patent Office 3,676,289
Patented July 11, 1972

3,676,289
TECHNIQUES FOR FORMING SEALS BETWEEN POLYETHYLENE AND FLUOROCARBON POLYMERS
Katsuyuki Hara, Plainfield, and Harold Schonhorn, New Providence, N.J., assignors to Bell Telephone Laboratories, Incorporated, Murray Hill and Berkeley Heights, N.J.
No Drawing. Filed Apr. 29, 1970, Ser. No. 33,035
Int. Cl. B32b 27/30, 27/16, 27/32
U.S. Cl. 161—189   5 Claims

ABSTRACT OF THE DISCLOSURE

A technique for preparing plastic laminates comprising a low surface energy polymer bonded with polyethylene involves modifying the surface of the polymer to effect an increase in the strength of its surface layer and subsequently melting polyethylene upon the resultant modified polymer.

BACKGROUND OF THE INVENTION

(1) Field of the invention

This invention relates to a technique for the fabrication of a plastic laminate. More particularly, the present invention relates to plastic laminates comprising a low surface energy fluorinated thermoplastic material and polyethylene.

(2) Description of the prior art

It has generally been accepted in the plastics industry that fluorocarbon polymers cannot be bonded with polyethylene in the absence of a conventional adhesive. Accordingly, workers in the art have focused their attention upon the bonding of thermoplastic compositions with each other without the necessity of interposing an adhesive composition therebetween.

SUMMARY OF THE INVENTION

In accordance with the present invention, such end is attained by a procedure wherein a low surface energy polymer destined for bonding with polyethylene is subjected to surface modification so that it is suitable for conventional adhesive bonding, and polyethylene subsequently melted upon the modified surface. Upon cooling, the resultant plastic laminate evidences tensile shear strengths comparable or greater than those obtained in accordance with conventional prior art procedures utilizing an adhesive composition as the bonding medium.

DETAILED DESCRIPTION

The polymers employed in the practice of the invention are fluorocarbons evidencing weak boundary layers (as indicated by their inability to form strong adhesive joints without suitable surface treatment.) Typical fluorocarbon polymers suitable in the practice of the present invention are polytetrafluoroethylene, polyvinylfluoride and copolymers of perfluorinated ethylene and propylene.

As noted, the inventive technique involves melting polyethylene upon a fluorocarbon polymer manifesting a low surface energy, typically less than 50 dynes per centimeter subsequent to surface modification of the polymer surface. In other words, the described procedure initially involves transforming the weak boundary layer on the polymer surface to a strong boundary layer and then melting the polyethylene thereon.

The first step in the practice of the present invention involves cleansing both the polymer of interest and the polyethylene to be joined therewith by means of conventional solvents for the purpose of removing surface debris. Thereafter, the fluorocarbon polymer is subjected to surface modification by any well-known procedure as, for example, corona discharge treatment, sodium etching, metal nucleation, bombardment with activated species of inert gases, etc. A convenient procedure for effecting this end is described in U.S. Pat. 3,462,335, issued to R. H. Hansen and H. Schonhorn on Oct. 19, 1969. The procedure described therein involves bombarding the polymeric material of interest for a time period of at least one second with a stream of an excited inert gas which is nonreactive with the polymer under ordinary conditions. The rare gases, such as helium, argon, neon, khyton and xenon, are suitable in this use. Nitrogen and hydrogen have also been found useful for this purpose as well as mixtures thereof with the rare gases. Still another convenient procedure involves metal nucleation wherein the polymer to be surface modified is melted upon a high energy surface manifesting a surface energy greater than 50 dynes per centimeter and after cooling is separated from the surface by dissolution of the substrate. Under these circumstances, extensive nucleation of the polymer occurs during the cooling process which results in the formation of a transcrystalline region which in turn causes the formation of a plurality of entanglements which act as crosslinks and preclude the formation of a weak boundary layer.

The resultant surface modified polymer now manifests a strong boundary layer upon which extensive interfacial contact (wetting) with polyethylene may be effected. This end is attained by simply melting the polyethylene upon the surface of the treated polymer. It will be understood by those skilled in the art that the ultimate joint strength of he bond between the polyethylene and the fluorocarbon polymer is dependent in part upon the extend of wetting attained in this stage of the operation, an optimum condition being the attainment of a contact angle of zero degrees. Accordingly, the duration of heating is dictated by considerations relating to the time required to obtain a contact angle approaching zero degrees.

Examples of the present invention are described in detail below. There examples are included merely to aid in the understanding of the invention and variations may be made by one skilled in the art without departing from the spirit and scope of the invention.

EXAMPLE I

This example describes the bonding of polyethylene with perfluorinated ethylene-propylene copolymers. The perfluorinated ethylene-propylene copolymer film, 10 mils in thickness, was initially rinsed in acetone to remove dust and surface contamination and then dried under vacuum at room temperature. Thereafter, the film was inserted in a bombardment chamber and the system pumped down to a pressure of the order of 0.1 millimeter of mercury and helium introduced into the system at a rate of 4 cubic centimeters per minute, a partial pressure of approximately one millimeter of mercury being maintained. The electrical system of the apparatus was then activated by a 100 watt RF source, so resulting in excitation of the helium which was permitted to bombard the copolymer for a time period of one second.

Thereafter, a pair of 1" x 3" x 10 mil samples of polyethylene obtained from commercial sources were washed with acetone, dried in air and the previously treated copolymer placed between the pair of sections of polyethylene. The resultant assembly was next placed between a pair of heated platens and heated at a temperature of 180° C. for 60 minutes. Then, the assembly was cooled to room temperature by placing it upon a bench top.

In order to demonstrate tensile shear strengths of the resultant laminate, composites were prepared in accordance with the following procedure.

Metal tensile shear adherends, 5 x 1 x 1/16 inches of 2024-T3 aluminum obtained from commercial sources were selected. The surface of the aluminum adherends was prepared by vapor degreasing in trichloroethylene in accordance with conventional procedures and subsequently etched for seven minutes at 65° C. in a solution comprising one part by weight sodium dichromate, 30 parts by weight water and 10 parts by weight of 95 percent sulfuric acid. Following etching, the adherends were rinsed for five minutes in running tap water, for one minute in running distilled water and then dried in a forced air oven at 60° C.

For measuring tensile shear strengths, composite test pieces comprising aluminum-polyethylene-perfluorinated copolymer-polyethylene-aluminum were prepared in a device designed to maintain a ½ inch overlap, the thickness of the perfluorinated polymer being maintained constant with insertion of a piece of 0.003 inch diameter wire in each glue line between the aluminum and the perfluorinated polymer. Bonding of the aluminum to the perfluorinated polymer-polyethylene structure was effected at a pressure of 20 pounds per square inch by placing the composites in forced air ovens maintained at 180° C. for 60 minutes. The resultant bonded structures were treated in accordance with ASTM-D-1002-53T except that the strain rate was 0.1 inch per minute. The tensile shear strength of the composites measured was found to range from 1400 to 1800 pounds per square inch at joint formation temperatures ranging from 130 to 170° C.

For comparative purposes, the procedure was repeated with the exception that the perfluorinated copolymer was not subjected to surface modification. The tensile shear strength of the resultant composites was found to be essentially zero.

EXAMPLE II

The procedure of Example I was repeated with the exception that the fluorinated polymer employed was surface modified polytetrafluoroethylene, 10 mils in thickness. The tensile shear strength was found to range from 1100 to 1500 pounds per square inch at joint formation temperatures ranging from 130 to 170° C. Once again, for comparative purposes, the composites were prepared utilizing polytetrafluoroethylene that had not been previously surface modified. The tensile shear strength of the resultant composites was found to be about 50 pounds per square inch at joint formation temperatures ranging from 130 to 170° C.

EXAMPLE III

The procedures of Example I was repeated with the exception that the surface modification of the perfluorinated copolymer was attained by melting it upon a gold surface manifesting a surface energy greater than 50 dynes per centimeter and subsequently separating the polymer from the gold. The tensile shear strength was found to be 1800 pounds per square inch at a joint formation temperature of 130° C. as compared with a tensile shear strength of zero for the untreated film, that is, one that had not been previously surface modified.

We claim:

1. A technique for forming a seal between polyethylene and a fluorocarbon polymer evidencing weak boundary layers on the surface thereof, said polymer being selected from the group consisting of polytetrafluoroethylene, polyvinylfluoride and copolymers of perfluorinated ethylene and propylene, which comprises modifying the surface of said fluorocarbon by subjecting the fluorocarbon polymer to a stream of excited inert gas for a time period of at least one second, thereby transforming said weak boundary layer into a strong boundary layer and subsequently melting polyethylene thereon.

2. A technique in accordance with claim 1 wherein said fluorocarbon polymer is polytetrafluoroethylene.

3. A technique in accordance with claim 1 wherein said fluorocarbon polymer is a copolymer of perfluorinated ethylene and propylene.

4. A technique for forming a seal between polyethylene and a fluorocarbon polymer evidencing weak boundary layers on the surface thereof, said polymer being selected from the group consisting of polytetrafluoroethylene, polyvinylfluoride and copolymers of perfluorinated ethylene and propylene, which comprises modifying the surface of said fluorocarbon by melting the fluorocarbon polymer upon a high energy surface evidencing a surface energy of at least 50 dynes per centimeter and separating said surface from the polymer by dissolution of said surface, thereby transforming said weak boundary layer into a strong boundary layer and subsequently melting polyethylene thereon.

5. A technique in accordance with claim 4 wherein said fluorocarbon polymer is a copolymer of perfluorinated ethylene and propylene.

References Cited

UNITED STATES PATENTS

| | | | |
|---|---|---|---|
| 3,575,793 | 4/1971 | Paisley | 156—272 X |
| 3,600,289 | 8/1971 | Bragole | 161—188 X |
| 3,578,527 | 5/1971 | Sakata et al. | 156—306 |
| 3,454,461 | 7/1969 | Paxton | 161—189 |
| 3,133,854 | 5/1964 | Simms | 161—189 |
| 2,879,547 | 3/1959 | Morris | 161—189 X |
| 2,789,063 | 4/1957 | Purvis et al. | 117—47 A |
| 2,871,144 | 1/1959 | Doban | 161—189 X |
| 3,111,424 | 11/1963 | Le Clair | 117—93.3 X |
| 3,284,277 | 11/1966 | Bonacci et al. | 161—188 |
| 3,287,197 | 11/1966 | Errede | 161—188 X |
| 3,455,774 | 7/1969 | Lindsey et al. | 161—189 |

HAROLD ANSHER, Primary Examiner

U.S. Cl. X.R.

117—47 A, 93.31; 156—272, 306; 161—188